United States Patent [19]

Jain et al.

[11] Patent Number: 4,990,471
[45] Date of Patent: Feb. 5, 1991

[54] PROCESS FOR PRODUCING SILICON NITRIDE

[75] Inventors: Mukesh K. Jain; Sadashiv Nadkarni, both of Jonquiere, Canada

[73] Assignee: Alcan International Limited, Montreal, Canada

[21] Appl. No.: 262,605

[22] Filed: Oct. 26, 1988

[30] Foreign Application Priority Data

Jan. 8, 1988 [CA] Canada .................................. 556103

[51] Int. Cl.$^5$ ............................................. C04B 35/58
[52] U.S. Cl. ....................................... 501/97; 501/98; 423/344; 423/406
[58] Field of Search ................. 501/97, 98; 423/344, 423/406

[56] References Cited

FOREIGN PATENT DOCUMENTS

| | | | |
|---|---|---|---|
| 55-015946 | 2/1980 | Japan . | |
| 56-017910 | 2/1981 | Japan . | |
| 56-104779 | 8/1981 | Japan | 501/92 |
| 2066800 | 7/1981 | United Kingdom | 501/97 |

*Primary Examiner*—Mark L. Bell
*Assistant Examiner*—Anthony J. Green
*Attorney, Agent, or Firm*—Cooper & Dunham

[57] ABSTRACT

A process for forming silicon nitride containing little or no silicon carbide. The process involves producing a uniform dispersion of finely divided silica particles in a polymer, heating the polymer/silica dispersion in a non-oxidizing atmosphere to carbonize the polymer, and heating the resulting carbonized product to a temperature in the range of 1300°–1800° C. in a non-oxidizing nitrogen-containing atmosphere. This latter heating step is carried out in the presence of a metal oxide (preferably alumina which is capable, in the reaction conditions, of reducing the amount of silicon carbide formed as an undesired by-product.

18 Claims, No Drawings

PROCESS FOR PRODUCING SILICON NITRIDE

BACKGROUND OF THE INVENTION

I. FIELD OF THE INVENTION

This invention relates to a process for producing silicon nitride.

II. DESCRIPTION OF THE PRIOR ART

Silicon nitride is a ceramic material that is in increasing demand these days for a variety of uses. For example, in the form of submicronic powders it is used for the production of sintered components. In the form of whiskers, it is used as a reinforcement for high temperature materials.

High purity $Si_3N_4$ is generally produced by a gas phase reaction of silicon halide and ammonia. Another method involves the carbo-nitridation of $SiO_2$ in which fine amorphous silica is reacted with lampblack at temperatures below 1500° C. in a nitrogen atmosphere to produce $Si_3N_4$. However, in the latter method, about 3–4% by weight of unreacted $SiO_2$ remains in the nitride product.

An improvement of the carbo-nitridation method is disclosed in Japanese patent application publications Nos. 1981-17910 and 1980-15946 both in the name of Toray Industries Inc. and laid open for inspection on Feb. 20, 1981 and Feb. 4, 1980, respectively. In the methods of these patent publications, extremely fine silica powder is dispersed in an organic polymer of the polyacrylonitrile group and is heat treated in a nitrogen or ammonia atmosphere. Despite statements in the patent publications that these methods result in the formation of a highly pure, finely divided silicon nitride product, the present inventors have not been able to obtain a pure product in this way. In particular, the product tends to be contaminated with silicon carbide formed as a by-product during the reaction and there is incomplete conversion of the $SiO_2$.

An object of the invention is therefore to provide an improved method of preparing silicon nitride of high purity.

SUMMARY OF THE INVENTION

The present invention is based on the unexpected finding that certain metal oxides (not including silica, of course), and particularly alumina, are capable of reducing or eliminating the amount of silicon carbide produced during the reaction of silica with carbon at high temperature in a nitrogen-containing atmosphere and that consequently $Si_3N_4$ powder of high purity can be produced.

According to the invention there is provided a process for preparing silicon nitride, which comprises: producing a uniform dispersion of finely divided silica particles in a polymer; heating the polymer/silica dispersion in a non-oxidizing atmosphere to carbonize the polymer; and heating the resulting carbonized product to a temperature in the range of 1300°–1800° C. in a non-oxidizing nitrogen-containing atmosphere in the presence of a metal oxide capable, in the reaction conditions, of reducing the amount of silicon carbide formed as an undesired by-product.

It should be understood that the term "silica" includes precursors of silica which convert to silica particles during the process of the invention prior to the nitride-forming step.

DETAILED DESCRIPTION OF THE PREFERRED EMBODIMENTS

The metal oxide used to suppress the formation of silicon carbide does not appear to act as a catalyst as such because it is itself largely or completely consumed during the reaction. Although the mechanism by which the metal oxide exerts its effect is not definitely known, it is postulated that the metal oxide reacts with carbon to form a volatile and reactive sub-oxide which in turn reacts with SiC as it is formed to convert it to volatile silicon monoxide which is either driven off or reacts with nitrogen to form the desired silicon nitride product. Hence, the metal oxide appears to act as a scavenger for the SiC product. The reaction mechanism may be as follows, using $Al_2O_3$ as an example:

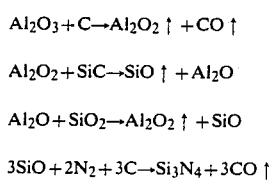

$$Al_2O_3 + C \rightarrow Al_2O_2 \uparrow + CO \uparrow$$

$$Al_2O_2 + SiC \rightarrow SiO \uparrow + Al_2O$$

$$Al_2O + SiO_2 \rightarrow Al_2O_2 \uparrow + SiO$$

$$3SiO + 2N_2 + 3C \rightarrow Si_3N_4 + 3CO \uparrow$$

Very little or no alumina remains in the reaction product, presumably because any excess $Al_2O_2$ is volatile and is driven off. Even if small amounts of alumina do remain, this is not harmful because alumina is often added in small quantities to silicon nitride to act as a sintering aid.

In addition to alumina, metal oxides found useful in the present invention are generally the oxides of metals of Group 3 of the Periodic Table, e.g. the oxides of boron, aluminum and yttrium. The oxide of boron ($B_2O_3$) has the slight disadvantage that it is soluble in dimethylformamide (DMF), a solvent often used (as will be explained later) in the preparation of the starting materials. Consequently, $Al_2O_3$ and $Y_2O_3$ are the most preferred metal oxides for use as SiC scavengers in the present invention.

The metal oxide should preferably be present in an amount of less than about 2% by weight based on the weight of silica used as a starting material. When more than this amount is employed, it is found that other materials, e.g. $Si_2ON_2$, may be formed as well as the desired $Si_3N_4$. There is no precise lower limit for the amount of the metal oxide used as the scavenger, but clearly there should be sufficient present to achieve the desired result of SiC suppression.

In a preferred form of the invention, the metal oxide is used in powder form and is thoroughly mixed with the starting materials. To achieve an efficient scavenging effect and an homogeneous product, the metal oxide is preferably in the form of particles having an average size of less than 5 microns (desirably less than one micron) and is dispersed uniformly throughout the starting materials. While this is preferred, it is possible (although less desirable) to provide the metal oxide either in the form of large particles, the unreacted parts of which can readily be removed from the reaction products, or to use the metal oxide to form the walls of the reactor used for the nitride-forming heating step. With these methods, however, it may be difficult to prevent an excess of the metal oxide from taking part in the reaction, and moreover the resulting product may be rather unhomogenous.

As well as employing the metal oxides indicated above as scavengers for SiC, various other procedures should desirably be carried out to ensure complete reaction between the silica, carbon and nitrogen.

Firstly, the silica starting material should be in extremely fine powder form, generally less than about 5 microns in average particle size, and preferably less than one micron, in order to provide a large surface to volume ratio so that the silica may react rapidly and completely with the carbon.

The silica starting material is preferably fairly pure because any impurities remain in the $Si_3N_4$ product. However, small amounts of certain impurities may actually be beneficial. The presence of alkali metal oxides, particularly $K_2O$, is desirable for reasons given later. However, elements such as Fe, Co, Ni etc. are undesirable. Preferred forms of silica for use in the present invention are precipitated silicas and so-called "fume silicas" produced by the silicon industry. Microfine silicas obtained from Degussa are particularly suitable.

Secondly, the silica particles (and desirably the metal oxide particles) should be uniformly dispersed in the carbon-precursor polymer to ensure that the particles are each coated (after carbonization) with carbon so that direct reaction may take place.

One way of forming the uniform dispersion of the silica in the polymer is to mix the particles thoroughly with a polymer melt, followed by allowing the melt to cool. Polymers having relatively low viscosities in the molten state should be chosen and, if necessary, plasticisers may be added to the polymer melt in order to make it more fluid and thus permit the oxide particles to be uniformly distributed.

When the polymer/oxide intermediate product is formed by dispersing the microfine oxide particles in a polymer melt, high torque mixing equipment may be required because of the high viscosities normally encountered. If the dispersion step is carried out for a suitable length of time, an homogenous distribution of the oxide particles can be achieved. The molten dispersion can then be shaped as desired and allowed to cool.

However, the preferred way of forming the uniform dispersion of the oxide particles in the polymer is to form a solution of the polymer in a solvent, introduce the silica (and desirably the metal oxide) particles into the solution, agitate the solution to disperse the particles uniformly, and then remove the solvent from the solution. The solvent employed should preferably have a lower affinity for the silica than the polymer does. The solvent can be removed by evaporation or by solvent extraction (also known as "liquid drying") which involves introducing the polymer solution into a bath of a liquid non-solvent for the polymer, the non-solvent being miscible with the solvent. This causes the polymer to precipitate or coagulate rapidly without disturbing the dispersion of the silica particles and allows the polymer/oxide dispersion to be formed into suitable shapes. The resulting product is a solidified polymer containing a uniform dispersion of silica (and desirably metal oxide) particles held separate from each other by an encircling matrix of polymer. When choosing a polymer for this preferred process, an important consideration is the availability of a suitable non-solvent. It is advantageous, for example, to choose a solvent and non-solvent which are easily separable from each other (e.g. by distillation) so that one or both may be re-used.

When the metal oxide is to be mixed with the reactants, one way of achieving this is to add the metal oxide, in finely divided powder form, preferably less than one micron in size, to the polymer solution either before, together with or after the silica powder. The metal oxide should then be dispersed uniformly in the same way as the silica particles.

The polymer employed in the process is preferably one which has an affinity for the silica. This means a polymer which is attracted to the silica surfaces when the polymer is in solution or in the molten state. Another way of expressing this is to say that the electrokinetic potential ($\xi$) of the polymer/silica interface should be high. When this is the case, the polymer tends to coat the silica particles and this effect may be greater than the Van der Waals forces which tend to attract silica particles to each other and thus make them agglomerate. The polymer should desirably have a molecular weight of at least 10,000 (preferagbly at least 50,000 and more usually at least 100,000), and a long chain structure of at least 200 monomer units. When solutions or melts of such polymers are formed, the fine silica particles can be dispersed in the solutions or melts by vigorous stirring to form stable suspensions in which the particles are separated from each other by surrounding polymer solution. The long-chain structure of the polymer is believed to hold the particles in suspension by virtue of the entanglement of the polymer chains with the particles. The silica particles consequently have little or no tendency to agglomerate and they react individually with the carbon during the later nitride-formation step. A surfactant may optionally be added to the polymer solution to help keep the silica particles separate and in suspension for long periods of time, but this is not usually required. It has been found that agglomeration of the silica particles is to be avoided because this results in incomplete reaction during the nitride-formation step. Instead of reacting with carbon and nitrogen, agglomerated particles may fuse together, trapping carbon and impurities therein.

The polymer should also desirably be capable of generating a carbon structure of optimum porosity upon being carbonized. The porosity should be low enough to limit the loss of the volatile silica sub-oxide when the nitride-forming reaction is carried out because the sub-oxide cannot then easily escape before further reaction takes place. At the same time, the diffusion in of $N_2$ has to be permitted, as well as the escape of CO, to allow for complete conversion of the oxide to the nitride. Since $N_2$ and CO have lower molecular weights than SiO, they diffuse through the carbon matrix more readily than the SiO so it is possible to obtain a carbon structure which retains the SiO while allowing $N_2$ and CO to diffuse.

The polymer should preferably also have a chemical structure which is infusible or which is capable of being rendered infusible by additional steps, e.g. cyclisation and/or cross-linking, etc. carried out prior to the carbonization treatment. The infusible structure ensures that the gases generated during carbonization evolve from a solid rather than a liquid, so that the uniform distribution of oxide particles is not disturbed.

The polymer desirably has a high carbon yield of at least 30% by weight (and preferably at least 40% by weight) when subjected to carbonization. This ensures that each silica particle is surrounded by sufficient carbon to permit substantially complete conversion to the sub-oxide (which is in turn converted to the nitride). The carbon formed from the polymer should also have high reactivity so that the formation of the volatile sub-oxide is accelerated.

When the dispersion is to be formed by the use of a polymer solution, the polymer starting material should preferably be readily soluble in a solvent and should preferably be capable of producing a solution which (after the addition of the oxide and optional additional ingredients) has a viscosity in the range of 200–5000 cp at 25° C., and preferably 500–1500 cp at 25° C. A solution of this viscosity can easily be handled.

Suitable polymer materials for use in the present invention include polyacrylonitrile and its copolymers and terpolymers (collectively referred to hereinafter as PAN), cellulose and its derivatives (e.g. cellulose acetate and the material sold under the trade mark RAYON), polyvinyl alcohol and its copolymers and terpolymers (referred to hereinafter as PVA), polyarylether, polyacenaphthylene, polyacetylene, and the like. Additional suitable materials are also disclosed in "Precursors for Carbon and Graphite Fibers" by Daniel J. O'Niel, Itern. J. Polymeric Mater. Vol. 7, (1979) p. 203.

PAN is a known polymer having a high carbon yield of about 55% by weight widely used for textiles such as ORLON (trademark) manufactured by E. I. DuPont de Nemours and Company (the structure of this particular product is discussed in an article by R. C. Houtz, Textile Research Journal, 1950, p. 786). Textile grade PAN is commonly a copolymer of acrylonitrile and up to 25% by weight (more commonly up to 10% by weight and usually about 6% by weight) of methyl acrylate or methyl methacrylate. Textile grade PAN copolymers can be used in the present invention and are in fact preferred to PAN homopolymer because the additional units in the copolymer assist in the cyclization of the polymer when heated in air at about 200° C. for several hours, a step known as heat stabilization. Inexpensive waste PAN from the textile industry, such as the so-called "dryer fines" produced by textile companies, may be employed in the present invention.

When PAN is used as the polymer, suitable solvents are dimethylformamide (DMF) dimethylsulfoxide (DMSO) and dimethylacetamide (DMAc). DMF is the preferred solvent and solutions of suitable viscosity can be made by dissolving a sufficient amount of PAN in DMF to give a solution containing 5–20% by weight, more preferably 8–16% by weight and most preferably 8–12% by weight of PAN.

When the polymer is cellulose or a cellulose derivative, a suitable solvent is DMF containing about 10% by weight of $LiCl_2$. A suitable solvent for PVA is DMF.

When the solution contains cellulose in $LiCl_2$-DMF, the non-solvent may be water or a water-DMF mixture. When the solution contains PVA in DMF, the non-solvent may be acetone or methyl ethyl ketone. When the solution contains PAN in DMF, the non-solvent may be water or methanol. Suitability as a non-solvent for the PAN/DMF system appears to be associated with a high polarity and the presence of —OH groups. Acetone, for example, is not suitable as a non-solvent. Since water is inexpensive, it is the preferred non-solvent, but is advantageously mixed with the solvent itself, e.g. DMF, for the following reason. If the non-solvent alone is used in the bath, the solvent extracted from the droplets causes the solvent concentration in the bath to change rapidly, and this markedly affects the conditions under which the coagulation or precipitation of the polymer take place. When the bath already contains a large amount of solvent, the solvent concentration in the bath changes less rapidly as the process proceeds. Accordingly the bath advantageously contains 25% by weight or more of the solvent when the process is commenced. When the polymer is PAN and the solvent is DMF, the bath preferably contains 0–80% by weight of DMF in water, more preferably 25–60% by weight and normally about 40% by weight. If desired, the amount of solvent in the bath can be kept constant by continuously adding a suitable amount of the non-solvent.

In more detail, the polymer is first dissolved in the solvent to form a solution of the desired viscosity. The amount of polymer dissolved in the solvent determines the amount of oxide that can be subsequently added, but if too much polymer is dissolved, the viscosity of the solution may become too high for easy processing.

The microfine silica particles (and preferably metal oxide particles) are then suspended in the polymer solution. This is preferably done with vigorous stirring in order to break up any lumps of oxide particles and thus to ensure that complete separation of the particles takes place. Mechanical stirring or agitation is advisable, e.g. by using a common blender or an ultrasonic dispersion technique.

The amount of silica added to the solution should preferably be such that the weight ratio of $SiO_2$: C (derived from the polymer upon carbonization) is in the range of about 2.5–5:1. If the ratio is more than about 5:1, only SiO gas if formed. The tendency to form SiC is least when the ratio is close to but slightly higher than 2.5:1, which means that the ratio of carbon to silica is equal to or slightly less than the stoichiometrical amount for the reaction:

$$3\ SiO_2 + 6C + 2N_2 \rightarrow Si_3N_4 + 6CO.$$

The use of slightly less than the stoichiometrical amount of carbon does not lead to a product containing unreacted silica because the entire amount of silica is first converted to the volatile sub-oxide (SiO) and any excess escapes from the reaction medium. It has been found that the formation of the sub-oxide is accelerated in the presence of alkali metal elements such as potassium. It is therefore desirable either to use silica containing a potassium impurity (e.g. about 0.5–2.0% by weight of potassium as $K_2O$) or to add a potassium compound (e.g. $K_2CO_3$) to the starting materials.

The introduction of the polymer solution containing the silica and metal oxide (if desired) into the non-solvent bath can be carried out by any suitable method, e.g. by dividing the solution into droplets and allowing the droplets to fall into the bath or by extruding a constant stream of the solution into the bath below its surface. The former method results in the formation of small spheres of coagulated or precipitated polymer containing the silica and the latter method results in the formation of continuous noodles, strands or sheets of the polymer containing the silica.

After the polymer/silica intermediate shaped product has been formed in the non-solvent bath it is removed and dried under gentle heating, e.g. at about 100° C. in air or at a lower temperature in a vacuum.

The polymer/oxide intermediate product can then be subjected directly to the carbonization and nitride-forming steps if the polymer already has an infusible structure. However, the polymer may first require cross-linking or cyclization to make it infusible. Cellulose can be subjected directly to the carbonization treatment but PAN is preferably first subjected to a "heat stabilization" step in which the structure cyclizes, e.g. as follows:

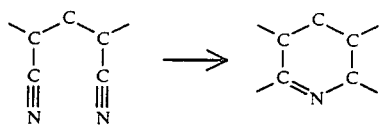

and consequently becomes infusible. This heat stabilization step, which is carried out by heating the polymer/oxide intermediate product in air at a temperature of about 200°-220° C. for several hours (usually 8-16 hours), also increases the oxygen content of the polymer. Alternatively, the polymer may be heated slowly in an $N_2$ atmosphere which helps to cyclise the polymer without oxygen absorption. The stabilization period may be reduced, if desired, by incorporating an antioxidant into the polymer solution prior to its coagulation or precipitation or at a later stage and then increasing the temperature in the stabilization treatment.

The carbonization and nitride-formation steps are then carried out on the heat-infusible polymer/silica intermediate product in the form of shapes which are loosely packed together.

A further important feature of the present invention is that the dispersion of the silica (and the metal oxide if present) in the polymer is formed into shapes in which substantially none of the silica particles is more than about 2.5 mm from an external surface (i.e. a surface of the shape which is in free contact with the reactive $N_2$). In general, this means that the thickness of the shapes, at least one dimension, is no greater than about 5 mm. The shapes can be large irregular or spherical particles, thin elongated cylinders (referred to hereinafter as "noodles" because of their resemblance to pasta noodles used in cooking), and the like. Advantageously, the shapes are such that they naturally pack together quite loosely for the reasons explained later, so films, cubes, fine powders etc. should preferably be avoided. The formed shapes are then loosely packed in a reactor before the carbonization and the nitride-forming reactions take place.

The nitride-forming reaction is believed to proceed as follows:

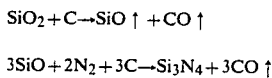

$3SiO + 2N_2 + 3C \rightarrow Si_3N_4 + 3CO \uparrow$

The intermediate SiO is a volatile product at the reaction temperatures and yet it must contact gaseous nitrogen and solid carbon in order to complete the nitride formation. This presents a dilemma. If the volatile sub-oxide oxides can diffuse freely from the carbonized dispersion, the product yield will be low. On the other hand, if the volatile sub-oxides are trapped deep within the carbonized dispersion, the nitrogen will not have very good access to them and an impure product (generally containing unconverted silica) will be formed. This problem is solved in the present invention by forming a carbonized dispersion having a dense structure which limits the escape of the volatile sub-oxide, but forming the dispersion into shapes which limit the maximum distance of penetration of the nitrogen into the dispersion to about 2.5 mm. By loosely packing such shapes into a reactor, nitrogen can pass freely through the voids between the shapes and similarly can penetrate the shapes to contact the sub-oxide. Ideally, the reactor packed with the shapes should have at least 40% of its volume in the form of voids between the packed shapes to allow easy access of nitrogen to the innermost packed shapes Preferably, the shapes are such that they cannot easily be packed to a high density, i.e. a density in which less than 40% of the volume of the packed mass comprises voids.

In the above system, the carbonized shapes form "microreactors" which trap the volatile sub-oxide and permit a control of particle shape while permitting diffusion of nitrogen to the vicinity of all of the silica particles.

Once the carbonization vessel has been loosely filled, the intermediate product is raised to carbonization temperatures (500°-700° C.) in a non-oxidizing atmosphere (e.g. nitrogen or argon) in order to convert the polymer to carbon. Indeed, the carbonization step may be carried out as the temperature of the intermediate product is raised to the nitride-forming range because carbonization takes place quite rapidly. For example, if the temperature of the intermediate product is gradually raised to the nitride-forming range over a period of about 30 minutes, carbonization of the polymer is complete before the nitride starts to form.

The nitride-formation step is carried out following the carbonizing step, or as already noted, as part of a single combined step in the same reaction vessel. The nitride formation step involves heating the carbon/oxide composite to high temperature (usually about 1,300° C. to 18,000° C.) in an atmosphere containing nitrogen for several hours (e.g. up to 12 hours) in the presence of the metal oxide. The nitrogen-containing atmosphere can be pure nitrogen, nitrogen mixed with a non-oxidizing gas, or an atmosphere of a compound which generates nitrogen in the reaction conditions, e.g. ammonia or an amine such as methylamine. The nitrogen-containing atmosphere is preferably flowing rather than static to ensure good penetration of the nitrogen into the reaction mass. The actual temperature employed and other reaction conditions depend on various factors as explained below.

The nitride-forming reaction may be carried out at atmospheric pressure or at high pressures. If the reactants do not have a metal oxide mixed with them, the reaction is carried out in a reactor made of, or lined with, the metal oxide. If the metal oxide is mixed with the reactants, then the reaction should be carried out in an inert reactor, e.g. one made of graphite.

The temperature at which the reaction is carried out determines whether the product is largely α-silicon nitride or β-silicon nitride.

Below about 1500° C., the production of SiO gas is quite slow but $\alpha$-$Si_3N_4$ predominates as the reaction product, particularly at temperatures of 1400°-1450° C. At these temperatures, the residence time should be at least six hours.

At temperatures above 1500° C., the reaction proceeds more quickly, and $\beta$-$Si_3N_4$ predominates as the product.

The size of the resulting $Si_3N_4$ particles is also affected by the reaction temperature because higher temperatures tend to result in larger particles. For example, at 1650° C., the particle size is 4-5$\mu$ but at 1550° C. it is only 2-3$\mu$.

If the α-form of $Si_3N_4$ is the desired product, the disadvantage of the slow reaction rate can be overcome by first heating the reactants at 1300°–1450° C. until the majority of the silica has reacted, and then raising the temperature above 1500° C. for a short time to drive the reaction to completion and to scavenge any SiC that may have been formed by the rapid production of SiO gas. The amount of $\beta$-Si$_3$N$_4$ is quite minor because of the short reaction time at the higher temperature.

The invention is illustrated in further detail by reference to the following Examples.

EXAMPLE 1

A number of tests were carried out using the following procedure but varying the reactant ratios, the presence of alumina as a SiC scavenger, the temperatures etc. as shown in the Table below.

The procedure was as follows. In all cases waste silica from the ferrosilicon industry (fume silica) was employed and the polymer was PAN. The PAN was dissolved in DMF and the silica was uniformly dispersed in the solution. The dispersion was then coagulated by dropping it into a liquid bath to form spheres of diameter less than 5 mm or extruding it below the surface of a liquid bath to form "noodles" of diameter less than 5 mm.

The liquid bath contained a mixture of DMF and water (40% DMF by volume) held at a temperature of about 55°–60° C.

The spheres or noodles were removed and dried and the noodles were chopped into lengths a few centimeters long. Heating in air at about 200° C. for 8 hours was carried out to stabilize the PAN.

The stabilized spheres or noodles were loosely packed into a crucible made of graphlite or alumina and a steady stream of nitrogen was directed through the crucible. The crucible was then gradually raised to the temperature indicated in the Table over the period of time indicated.

After cooling, the product was removed from the crucible and examined by X-ray diffraction (XRD). The crucible was also weighed to note the weight loss. The results are shown in the Table.

the ratio 9:7 for SiO$_2$:PAN corresponds approximately to the 2.5:1 ratio of SiO$_2$:C which is in the preferred range of 2.5–5:1 for SiO$_2$:C).

What we claim is:

1. A process for preparing silicon nitride, which comprises:
   producing a uniform dispersion of finely divided silica particles in a carbon-containing polymer, wherein the ratio of silica to polymer in the dispersion is such that, upon carbonization of the polymer, the weight ratio of silica to carbon is about 2.5–5:1;
   heating the polymer/silica dispersion in a non-oxidizing atmosphere to carbonize the polymer; and
   heating the resulting carbonized product to a temperature in the range of 1300°–1800° C. in a non-oxidizing nitrogen-containing atmosphere in contact with about 1 to 2% by weight (based on the weight of said silica) of a metal oxide selected from the group consisting of oxides of aluminum, boron and yttrium capable, in the reaction conditions, of reducing the amount of silicon carbide formed as an undesired by-product.

2. A process according to claim 1 wherein the metal oxide is Al$_2$O$_3$.

3. A process according to claim 1, wherein the metal oxide is in the form of finely divided particles and is uniformly dispersed in the polymer.

4. A process according to claim 1, wherein the metal oxide forms an interior surface of a reactor used for the step of heating said carbonized product.

5. A process according to claim 1, wherein the metal oxide is in the form of particles having an average size of less than about 5$\mu$ and is uniformly dispersed in the polymer.

6. A process according to claim 1, wherein the silica is in the form of particles having an average size of less than about 5$\mu$.

7. A process according to claim 1, wherein the silica contains an alkali metal compound as an impurity.

8. A process according to claim 1, wherein the silica

TABLE

| Test No. | Shape* | SiO$_2$:PAN | Al$_2$O$_3$** | Crucible*** | Temp. | Time (h) | Sic | Purity by XRD $\alpha$-Si$_3$N$_4$ | $\beta$-Si$_3$N$_4$ | Si$_2$ON$_2$ |
|---|---|---|---|---|---|---|---|---|---|---|
| 1 | S | 6:5 | — | G | 1455 | 9:45 | Maj | Min | Maj | — |
| 2 | S | 6:5 | — | G | 1400 | 10:00 | Maj | Maj | Med | — |
| 3 | N | 6:7.5 | — | G | 1650 | 4:00 | Maj | — | — | — |
| 4 | N | 6:7.5 | 1 | A | 1450 | 10:00 | Med | Maj | Min | Min |
| 5 | N | 6:7.5 | 1 | A | 1450 / 1650 | 6:00 / 4:00 | Maj | Min | Min | — |
| 6 | N | 9:7 | 1 | A | 1400 / 1650 | 6:00 / 4:00 | — | Min | Maj | — |
| 7 | N | 9:7 | 1 | A | 1400 / 1550 | 6:00 / 4:00 | — | Med | Maj | — |
| 8 | N | 10:7 | 1 | A | 1400 / 1550 | 6:00 / 6:00 | — | Med | Med | — |
| 9 | N | 9:7 | 2 | A | 1400 / 1500 | 6:00 / 7:00 | — | Min | Med | Maj |
| 10 | N | 10:7 | 2 | A | 1400 / 1600 | 12:00 / 0:5 | Med | — | Min | Maj |

Notes:
*S = spheres, N = noodles
**Al$_2$O$_3$ % was calculated as wt % of SiO$_2$ used
***G = graphite, A = alumina.
min = minor amount
med = medium amount
maj = major amount The figures given in the above Table show that the most preferred results (tests 6, 7 and 8) are obtained when the amount of alumina is less than 2% by weight and the weight ratio of SiO$_2$:PAN is 9 (or more):7 (NB contains a potassium compound as an impurity.

9. A process according to claim 1, wherein the step of heating the carbonized product is carried out in the presence of a potassium compound.

10. A process according to claim 1 wherein the polymer has the following characteristics:
   (a) a molecular weight of at least 10,000 and a long chain structure of at least 200 monomer units;
   (b) a carbon yield of at least 30% by weight upon being carbonized;
   (c) a chemical structure which is infusible or capable of being rendered infusible.

11. A process according to claim 1, wherein the polymer is selected from the group consisting of polyacrylonitrile and its copolymers and terpolymers, cellulose and its derivatives, polyvinyl alcohol and its copolymers and terpolymers, polyarylether, polyacenaphthylene and polyacetylene.

12. A process according to claim 1, wherein the polymer is polyacrylonitrile and wherein said polymer is subjected to a heat stabilization step by heating the polymer in air at a temperature of about 200°–220° C. for about 8–16 hours before being carbonized.

13. A process according to claim 1, wherein said polymer/silica dispersion is formed into shapes which pack loosely together such that at least 40% by volume of a mass of the packed shapes constitutes voids between said shapes.

14. A process according to claim 1, wherein said polymer/silica dispersion is formed into shapes in which substantially none of the silica particles is less than about 2.5 mm from an external surface of said shapes.

15. A process according to claim 1, wherein said nitrogen-containing atmosphere is flowing during said step of heating the carbonized product.

16. A process according to claim 1 for producing $\alpha$-silicon nitride, which comprises heating the carbonized product at a temperature below about 1500° C.

17. A process according to claim 1, for producing $\beta$-silicon nitride, which comprises heating said carbonized product at a temperature above about 1500° C.

18. A process according to claim 1, for producing $\alpha$-silicon nitride, which comprises heating said carbonized product at a temperature below about 1500° C. until a majority of the silica has reacted and then raising the temperature above 1500° C. for a time sufficient to drive the reaction to substantial completion.

* * * * *